US012172436B2

(12) United States Patent
Kida

(10) Patent No.: US 12,172,436 B2
(45) Date of Patent: Dec. 24, 2024

(54) LIQUID DISCHARGE APPARATUS, HEAD DRIVE CONTROL METHOD, AND HEAD DRIVE CONTROL DEVICE

(71) Applicant: Hitoshi Kida, Kanagawa (JP)

(72) Inventor: Hitoshi Kida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 17/956,138

(22) Filed: Sep. 29, 2022

(65) Prior Publication Data

US 2023/0027729 A1 Jan. 26, 2023

Related U.S. Application Data

(63) Continuation of application No. 16/952,447, filed on Nov. 19, 2020, now Pat. No. 11,498,329.

(30) Foreign Application Priority Data

Nov. 29, 2019 (JP) ................................ 2019-217359

(51) Int. Cl.
*B41J 2/045* (2006.01)
*B41J 2/14* (2006.01)

(52) U.S. Cl.
CPC ....... *B41J 2/04588* (2013.01); *B41J 2/04508* (2013.01); *B41J 2/04541* (2013.01); *B41J 2/04581* (2013.01); *B41J 2/04595* (2013.01); *B41J 2/14201* (2013.01)

(58) Field of Classification Search
CPC .................................................... B41J 2/04581
See application file for complete search history.

(56) References Cited

U.S. PATENT DOCUMENTS 11,498,329 B2 * 11/2022 Kida .................... B41J 2/04588
2003/0142160 A1 7/2003 Kobayashi et al.
2005/0200639 A1 * 9/2005 Kobayashi ........... B41J 2/04581 347/10
2007/0076022 A1 * 4/2007 Takizawa ............. B41J 2/04505 347/5

(Continued)

FOREIGN PATENT DOCUMENTS

JP 2003-211664 A 7/2003
JP 2014-058091 A 4/2014

(Continued)

OTHER PUBLICATIONS

Japanese Office Action for corresponding Japanese Patent Application No. 2019-217359 issued on Aug. 8, 2023.

*Primary Examiner* — Shelby L Fidler
(74) *Attorney, Agent, or Firm* — Harness, Dickey & Pierce, P.L.C.

(57) ABSTRACT

A liquid discharge apparatus includes a liquid discharger and circuitry. The liquid discharger includes a nozzle to discharge liquid. The circuitry is configured to generate and output a common drive waveform including a plurality of drive pulses for discharging the liquid; select one or more of the plurality of drive pulses from the common drive waveform and apply the one or more of the plurality of drive pulses to a pressure generating element of the liquid discharger; and adjust, with different adjustment values, application waveform shapes of at least two of the plurality of drive pulses applied to the pressure generating element.

9 Claims, 10 Drawing Sheets

(56) References Cited

U.S. PATENT DOCUMENTS

| | | | | |
|---|---|---|---|---|
| 2011/0063351 | A1* | 3/2011 | Kitaoka | B41J 2/04593 347/11 |
| 2011/0128317 | A1 | 6/2011 | Oshima et al. | |
| 2012/0262512 | A1* | 10/2012 | Oshima | B41J 2/04541 347/10 |
| 2015/0328886 | A1* | 11/2015 | Masui | B41J 2/04596 347/10 |
| 2017/0087826 | A1* | 3/2017 | Taira | B41J 2/04536 |
| 2017/0225461 | A1* | 8/2017 | Kondo | B41J 2/04596 |
| 2018/0056648 | A1 | 3/2018 | Lahiri et al. | |
| 2018/0099510 | A1 | 4/2018 | Niino | |

FOREIGN PATENT DOCUMENTS

| | | | |
|---|---|---|---|
| JP | 2014-172177 | A | 9/2014 |
| JP | 2016-198738 | A | 12/2016 |
| JP | 2018-058320 | A | 4/2018 |
| JP | 2018-509320 | A | 4/2018 |
| WO | WO-2016/142645 | A1 | 9/2016 |

* cited by examiner

LIQUID DISCHARGE APPARATUS, HEAD DRIVE CONTROL METHOD, AND HEAD DRIVE CONTROL DEVICE

CROSS-REFERENCE TO RELATED APPLICATION

This patent application is a continuation of and claims the benefit of priority under 35 U.S.C. §§ 120/121 to U.S. patent application Ser. No. 16/952,447, filed on Nov. 19, 2020, which is based on and claims priority pursuant to 35 U.S.C. § 119 (a) to Japanese Patent Application No. 2019-217359, filed on Nov. 29, 2019, in the Japan Patent Office, the entire disclosures of each of which are hereby incorporated by reference herein.

BACKGROUND

Technical Field

Embodiments of the present disclosure relate to a liquid discharge apparatus, a head drive control method, and a head drive control device.

Related Art

In a liquid discharge head, the discharge speed and the discharge amount of liquid vary among nozzles due to, for example, variations in manufacturing.

There has been known a configuration in which the electric-discharge time of a drive waveform (in other words, a falling portion of the drive waveform) is adjusted to adjust a voltage of an application waveform applied to a piezoelectric element for each nozzle so that the discharge amount (the weight of discharged droplet) be uniform among a plurality of nozzles.

SUMMARY

In an aspect of the present disclosure, there is provided a liquid discharge apparatus that includes a liquid discharger and circuitry. The liquid discharger includes a nozzle to discharge liquid. The circuitry is configured to generate and output a common drive waveform including a plurality of drive pulses for discharging the liquid: select one or more of the plurality of drive pulses from the common drive waveform and apply the one or more of the plurality of drive pulses to a pressure generating element of the liquid discharger; and adjust, with different adjustment values, application waveform shapes of at least two of the plurality of drive pulses applied to the pressure generating element.

In another aspect of the present disclosure, there is provided a head drive control method includes generating and outputting a common drive waveform including a plurality of drive pulses for discharging liquid from a plurality of nozzles of a liquid discharger; and adjusting, with different adjustment values, application waveform shapes of at least two of the plurality of drive pulses applied to a pressure generating element.

In still another aspect of the present disclosure, there is provided a head drive control device including circuitry. The circuitry is configured to: generate and output a common drive waveform including a plurality of drive pulses for discharging liquid from a plurality of nozzles of a liquid discharger: select one or more of the plurality of drive pulses from the common drive waveform and apply the one or more of the plurality of drive pulses to a pressure generating element of the liquid discharger; and adjust, with different adjustment values, application waveform shapes of at least two of the plurality of drive pulses applied to the pressure generating element.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
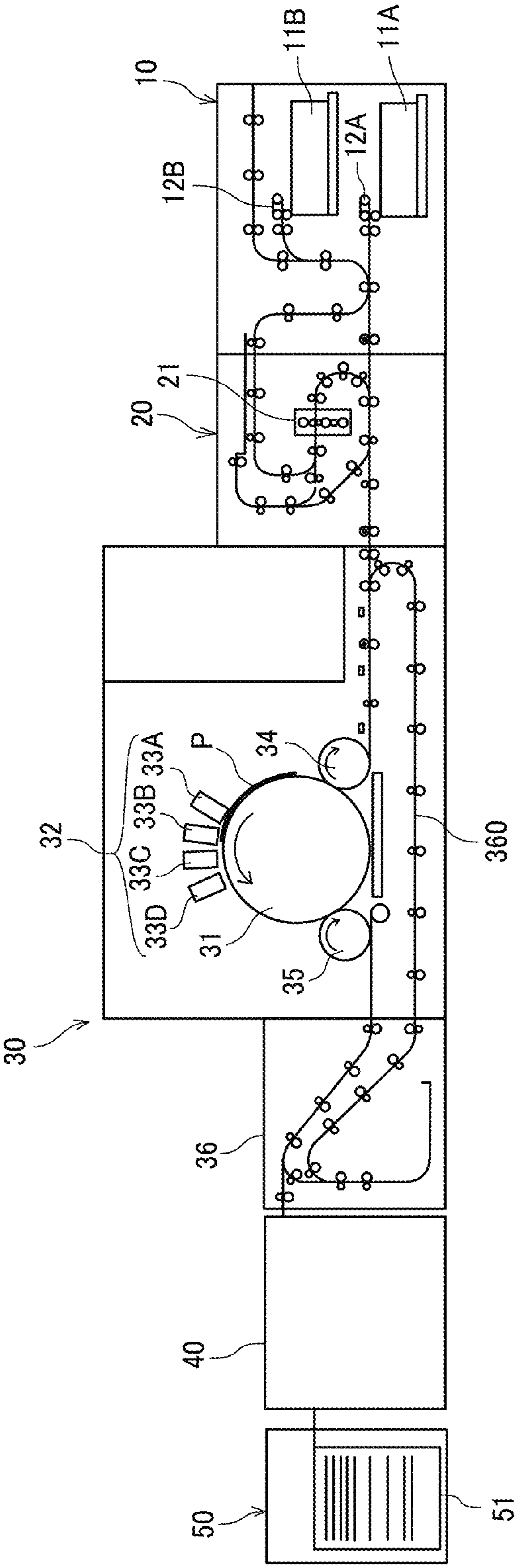
FIG. 1 is a schematic view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure are described with reference to accompanying drawings. In the following description, the same components are denoted by the same reference numerals, and redundant description may be omitted.

Figure 2:
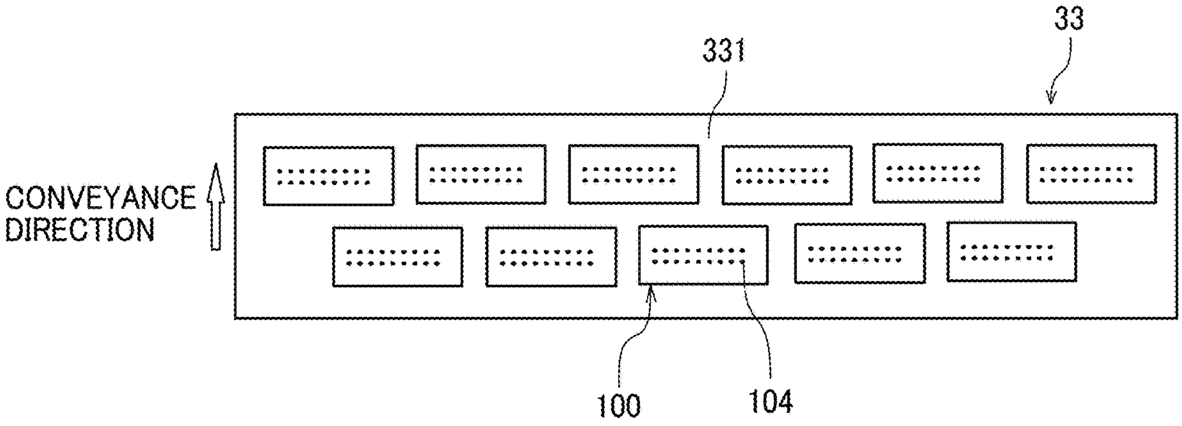
FIG. 2 is a plan view of a discharge unit of the printer of FIG. 1.

Referring now to the drawings, wherein like reference numerals designate identical or corresponding parts throughout the several views, exemplary embodiments of the present disclosure are described below. A printer as a liquid discharge apparatus according to a first embodiment of the present disclosure is described with reference to FIGS. 1 and 2. FIG. 1 is a schematic view of the printer according to the first embodiment. FIG. 2 is a plan view of a discharge unit of the printer.

A printer 1 according to the present embodiment includes a loading unit 10 to load a sheet P into the printer 1, a pretreatment unit 20, a printing unit 30, a drying unit 40, and an unloading unit 50. In the printer 1, the pretreatment unit 20 applies, as required, pretreatment liquid onto the sheet P fed (supplied) from the loading unit 10, the printing unit 30 applies liquid to the sheet P to perform printing, the drying unit 40 dries the liquid adhering to the sheet P, and the sheet P is ejected to the unloading unit 50.

The loading unit 10 includes loading trays 11 (a lower loading tray 11A and an upper loading tray 11B) to accommodate a plurality of sheets P and feeding devices 12 (a feeding device 12A and a feeding device 12B) to separate and feed the sheets P one by one from the loading trays 11, and supplies the sheets P to the pretreatment unit 20.

The pretreatment unit 20 includes, e.g., a coater 21 as a treatment-liquid applying device that coats an image formation surface of a sheet P with a treatment liquid having an effect of aggregating ink particles to prevent bleed-through.

The printing unit 30 includes a drum 31 and a liquid discharge device 32. The drum 31 is a bearer (rotating member) that bears the sheet P on a circumferential surface of the drum 31 and rotates. The liquid discharge device 32 discharges liquid toward the sheet P borne on the drum 31.

The printing unit 30 includes transfer cylinders 34 and 35. The transfer cylinder 34 receives the sheet P from the pretreatment unit 20 and forwards the sheet P to the drum 31. The transfer cylinder 35 receives the sheet P conveyed by the drum 31 and forwards the sheet P to the reversing unit 36.

The transfer cylinder 34 includes a sheet gripper to grip the leading end of the sheet P conveyed from the pretreatment unit 20 to the printing unit 30. The sheet P thus gripped is conveyed as the transfer cylinder 34 rotates. The transfer cylinder 34 forwards the sheet P to the drum 31 at a position opposite the drum 31.

Similarly, the drum 31 includes a sheet gripper on the surface thereof, and the leading end of the sheet P is gripped by the sheet gripper. The drum 31 has a plurality of suction holes dispersedly on the surface thereof, and a suction device generates suction airflows directed inward from suction holes of the drum 31.

On the drum 31, the sheet gripper grips the leading end of the sheet P forwarded from the transfer cylinder 34, and the sheet P is attracted to and borne on the drum 31 by the suction airflows by the suction device. As the drum 31 rotates, the sheet P is conveyed.

The liquid discharge device 32 includes discharge units 33 (discharge units 33A to 33D) as liquid dischargers to discharge liquids. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K). In addition, a discharge unit to discharge a special liquid, that is, a liquid of spot color such as white, gold, or silver, can be used.

The discharge unit 33 is a full line head and includes a plurality of liquid discharge heads 100 (hereinafter simply referred to as "heads 100") arranged in a staggered manner on a base 331. Each of the liquid discharge head 100 includes a plurality of nozzle rows and a plurality of nozzles 104 is arranged in each of the nozzle rows, for example, as illustrated in FIG. 2.

The discharge operation of each of the discharge units 33 of the liquid discharge device 32 is controlled by a drive signal corresponding to print data. When the sheet P borne on the drum 31 passes through a region facing the liquid discharge device 32, the respective color liquids are discharged from the discharge units 33, and an image corresponding to the print data is formed.

The reversing unit 36 reverses the sheet P in switchback manner when double-sided printing is performed on the sheet P transferred from the transfer cylinder 35. The reversed sheet P is fed back to the upstream side of the transfer cylinder 34 through a conveyance passage 360 of the printing unit 30.

The drying unit 40 dries the liquid applied onto the sheet P by the printing unit 30. As a result, a liquid component such as moisture in the liquid evaporates, and the colorant contained in the liquid is fixed on the sheet P. Additionally, curling of the sheet P is restrained.

The unloading unit 50 includes an unloading tray 51 on which a plurality of sheets P is stacked. The plurality of sheets P conveyed from the drying unit 40 are sequentially stacked and held on the unloading tray 51.

In the present embodiment, an example in which the sheet is a cut sheet is described. However, embodiments of the present disclosure can also be applied to an apparatus using a continuous medium (web) such as continuous paper or roll paper, an apparatus using a sheet material such as wallpaper, and the like.

Figure 3:
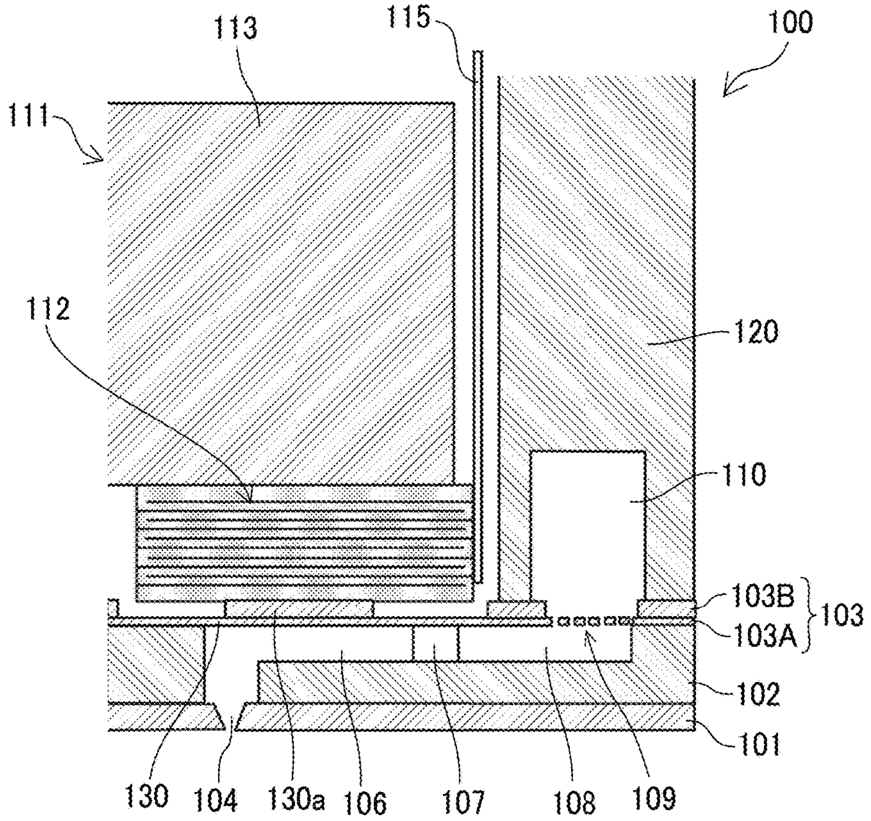
FIG. 3 is a cross-sectional view of an example of a liquid discharge head (also simply referred to as head) taken along a direction orthogonal to a nozzle array direction of the head.
Figure 4:
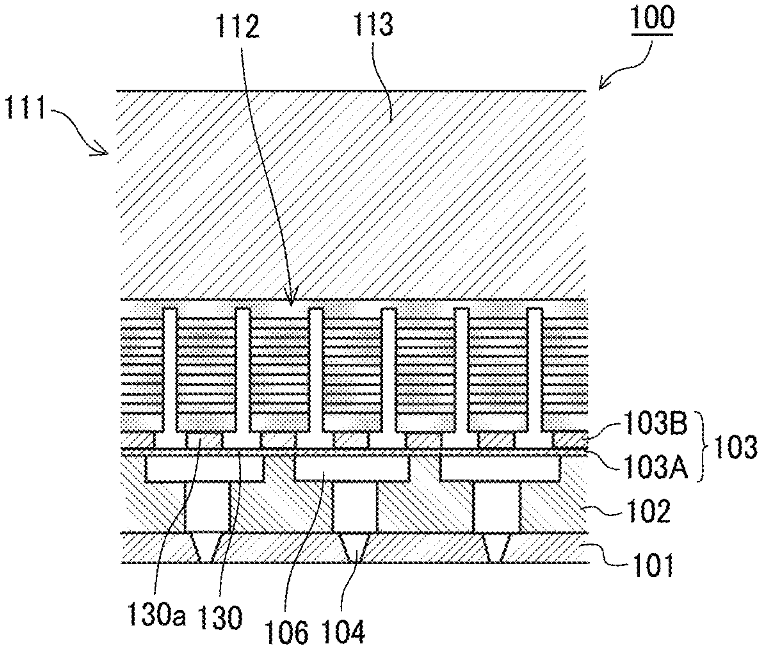
FIG. 4 is a cross-sectional view of the head taken along the nozzle array direction.

Next, an example of the head 100 is described with reference to FIGS. 3 and 4. FIG. 3 is a cross sectional view of the liquid discharge head, taken along a direction perpendicular to a nozzle array direction. FIG. 4 is a cross sectional view of the liquid discharge head, taken along the nozzle array direction.

The liquid discharge head 100 according to the present embodiment includes a nozzle plate 101, a channel plate 102, and a diaphragm member 103 as a wall surface member that are stacked and bonded. The liquid discharge head 100 also includes a piezoelectric actuator 111 and a common channel member 120. The piezoelectric actuator 111 displaces a vibration region (diaphragm) 130 of the diaphragm member 103. The common channel member 120 also serves as a frame member of the liquid discharge head 100.

The nozzle plate 101 has a plurality of nozzle rows in each of which a plurality of nozzles 104 for discharging liquid are arranged.

The channel plate 102 forms a plurality of pressure chambers 106 communicating with the plurality of nozzles 104, a plurality of individual supply channels 107 also serving as fluid restrictors communicating with the respective pressure chambers 106, and a plurality of intermediate supply channels 108 each serving as a liquid introduction portion communicating with two or more of the individual supply channels 107.

The diaphragm member 103 includes a plurality of displaceable diaphragms (vibration regions) 130 forming wall surfaces of the pressure chambers 106 of the channel plate 102. Here, the diaphragm member 103 has a two-layer structure (but is not limited to the two-layer structure) and includes a first layer 103A forming a thin portion and a second layer 103B forming a thick portion in this order from a side facing the channel plate 102.

The displaceable vibration region 130 is formed in a portion corresponding to the pressure chamber 106 in the first layer 103A which is a thin portion. In the vibration region 130, a convex portion 130*a* is formed as a thick portion joined to the piezoelectric actuator 111 in the second layer 103B.

The piezoelectric actuator 111 including an electromechanical transducer serving as a driving device (an actuator device or a pressure generating element) to deform the vibration region 130 of the diaphragm member 103 is disposed on a side of the diaphragm member 103 opposite a side facing the pressure chamber 106.

In the piezoelectric actuator 111, a piezoelectric member bonded on the base 113 is grooved by half-cut dicing, to form a desired number of columnar piezoelectric elements 112 at predetermined intervals in a comb shape. Every other piezoelectric element 112 is bonded to the convex portion 130*a* that is an island-shaped thick portion in the vibration region 130 of the diaphragm member 103.

The piezoelectric element 112 includes piezoelectric layers and internal electrodes alternately laminated on each other. Each internal electrode is led out to an end surface and connected to an external electrode (end surface electrode). The external electrode is connected with a flexible wiring member 115.

The common channel member 120 forms a common supply channel 110. The common supply channel 110 communicates with the intermediate supply channel 108 serving as the liquid introduction portion via an opening portion 109 also serving as a filter portion provided in the diaphragm member 103 and communicates with the individual supply channels 107 via the intermediate supply channel 108.

In the liquid discharge head 100, for example, the voltage to be applied to the piezoelectric element 112 is lowered from a reference potential (intermediate potential) so that the piezoelectric element 112 contracts to pull the vibration region 130 of the diaphragm member 103 to increase the volume of the pressure chamber 106. As a result, liquid flows into the pressure chamber 106.

Then, the voltage to be applied to the piezoelectric element 112 is increased to expand the piezoelectric element 112 in the stacking direction, and the vibration region 130 of the diaphragm member 103 is deformed in a direction toward the nozzle 104 to reduce the volume of the pressure chamber 106. As a result, the liquid in the pressure chamber 106 is pressurized and discharged from the nozzle 104.

Figure 5:
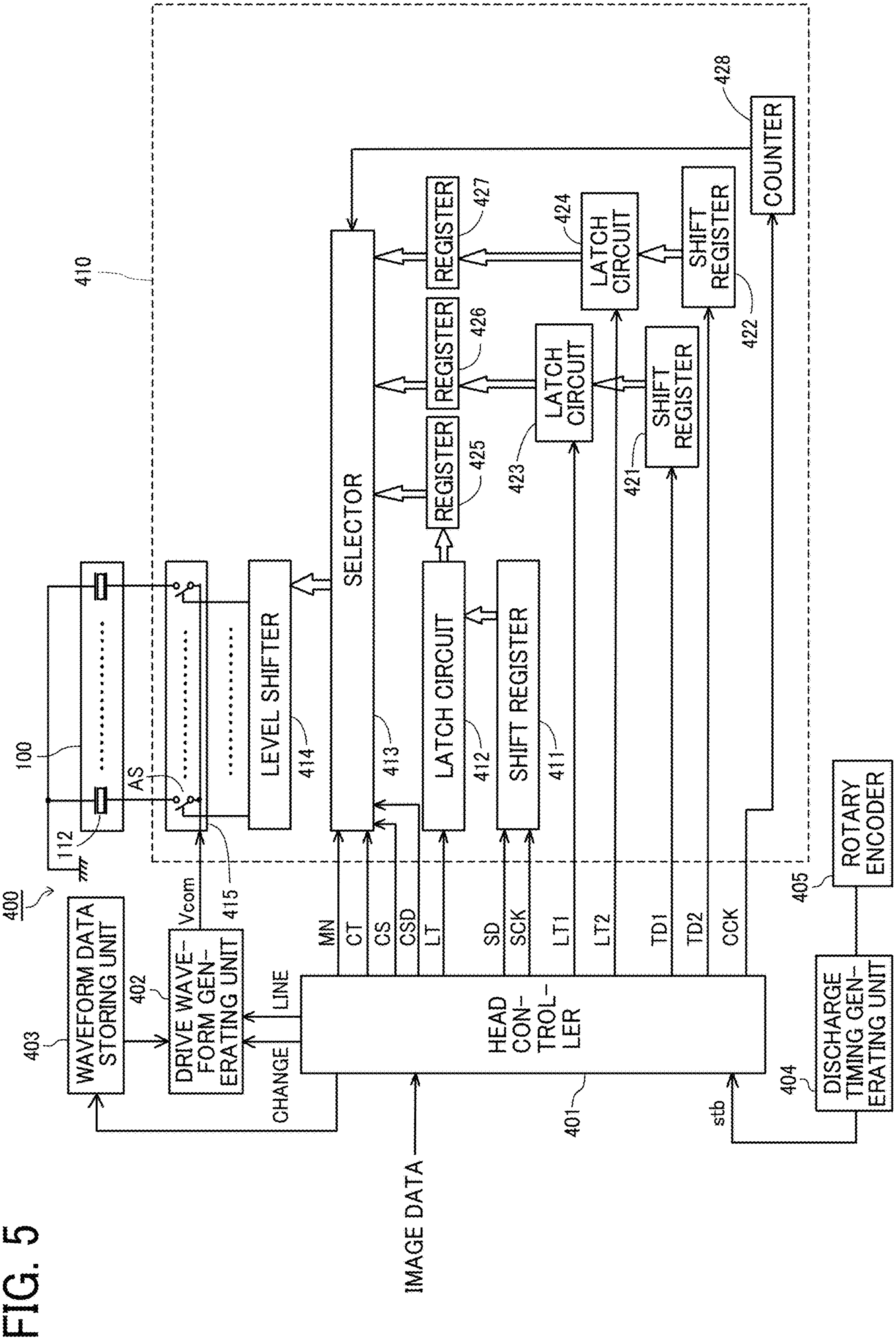
FIG. 5 is a block diagram of a head drive control device according to a first embodiment of the present disclosure.

Next, a head drive control device according to a first embodiment of the present disclosure is described with reference to FIG. 5. FIG. 5 is a block diagram of the head drive control device according to the first embodiment.

The head drive control device 400 includes a head controller 401, a drive waveform generating unit 402, a waveform data storage unit 403, a head driver (driver IC) 410, and a discharge timing generation unit 404. The drive waveform generating unit 402 and the waveform data storage unit 403 constitute a drive waveform generator. The head driver 410 is a head drive device according to an embodiment of the present disclosure. The discharge timing generation unit 404 generates a discharge timing.

In response to a reception of a discharge timing pulse stb, the head controller 401 outputs a discharge synchronization signal LINE that triggers generation of a common drive waveform, to the drive waveform generating unit 402. The head controller 401 outputs a discharge timing signal CHANGE corresponding to the amount of delay from the discharge synchronization signal LINE, to the drive waveform generating unit 402.

The drive waveform generating unit 402 generates and outputs a common drive waveform Vcom at the timing based on the discharge synchronization signal LINE and the discharge timing signal CHANGE.

The head controller 401 receives the image data and generates, based on the image data, a mask control signal MN to control the presence or absence of liquid discharge from each nozzle 104 of the head 100. The mask control signal MN is a signal at a timing synchronized with the discharge timing signal CHANGE.

The head controller 401 transmits image data SD, a synchronization clock signal SCK, a latch signal LT instructing latch of the image data, and the generated mask control signal MN to the head driver 410.

The head controller 401 transfers, to the head driver 410, trimming data TD1 and TD2, latch signals LT1 and LT2 for instructing the latch of the trimming data TD1 and TD2, a counter clock signal CCK, a counter trigger signal CT, an adjustment-value selection signal CS, and an adjustment-value-selection-signal determination signal CSD for determining whether the adjustment-value selection signal CS is “H” or “L”.

The head driver 410 is a selection unit that selects a waveform portion to be applied to each pressure generating element (piezoelectric element 112) of the liquid discharge head 100 in the common drive waveform Vcom, based on various signals from the head controller 401.

The head driver 410 includes a shift register 411, a latch circuit 412, a selector 413, a level shifter 414, and an analog switch (AS) array (switch unit) 415.

The head driver 410 includes shift registers 421 and 422, latch circuits 423 and 424, registers 425, 426, and 427, and a counter 428.

The shift register 411 receives the image data SD and the synchronization clock signal SCK transmitted from the head controller 401. The latch circuit 412 latches each resister value of the shift register 411 by the latch signal LT transmitted from the head controller 401. The value latched by the latch circuit 412 is stored in the register 425.

Similarly, the shift registers 421 and 422 receive different adjustment values (in this example, two adjustment values T1 and T2) transferred from the head controller 401 as the trimming values TD1 and TD2. The latch circuits 423 and 424, respectively, latch the register values of the shift register 421 and 422 by latch signals LT1 and LT2 transferred from the head controller 401. The values (adjustment values) latched by the latch circuits 423 and 424 are stored in the registers 426 and 427 as a holding unit that hold different adjustment values. The registers 426 and 427 constitute a holding unit.

The selector 413 is a selection unit to output a result based on the value (image data SD) stored in the register 425 and the head control signal MN.

The selector 413 receives the values (adjustment values) stored in the registers 426 and 427, the output signal from the counter 428, the counter trigger signal CT serving as a count start trigger signal, the adjustment-value selection signal CS, the adjustment-value-selection-signal determination signal CSD, and the count result of the counter 428 serving as a counter unit.

The selector 413 determines the adjustment value selected by the adjustment-value selection signal CS by the adjustment-value-selection-signal determination signal CSD for the nozzle 104 that discharges liquid, and outputs a signal for turning off the analog switch AS when the count result of the counter 428 becomes the adjustment value T1 or T2 according to the adjustment values T1 and T2 held in the register 426 and the register 427 for each drive pulse of the common drive waveform Vcom.

The level shifter 414 is a switcher to convert the level of a logic level voltage signal of the selector 413 to a level at which the analog switch AS of the analog switch array 415 can operate.

The analog switch AS of the analog switch array 415 is a switch that is turned on and off according to the output of the selector 413 supplied via the level shifter 414 and switches passing and non-passing (blocking) of the common drive waveform Vcom.

The analog switch AS is provided for each nozzle 104 of the head 100 and is connected to an individual electrode of the piezoelectric element 112 corresponding to each nozzle 104. In addition, the common drive waveform Vcom from the drive waveform generating unit 402 is input to the analog switch AS.

Therefore, the analog switch AS is switched on and off at an appropriate timing in accordance with the output of the selector 413 supplied via the level shifter 414. Thus, a waveform portion applied to the piezoelectric element 112 corresponding to each nozzle 104 is selected from the common drive waveform Vcom. As a result, the size of the droplet discharged from the nozzle 104 is controlled, and droplets of different sizes are discharged.

The discharge timing generation unit 404 generates and outputs the discharge timing pulse stb each time the sheet P is moved by a predetermined amount, based on the detection result of a rotary encoder 405 that detects the rotation amount of the drum 31. The rotary encoder 405 includes an encoder wheel that rotates together with the drum 31 and an encoder sensor that reads a slit of the encoder wheel.

Figure 6:
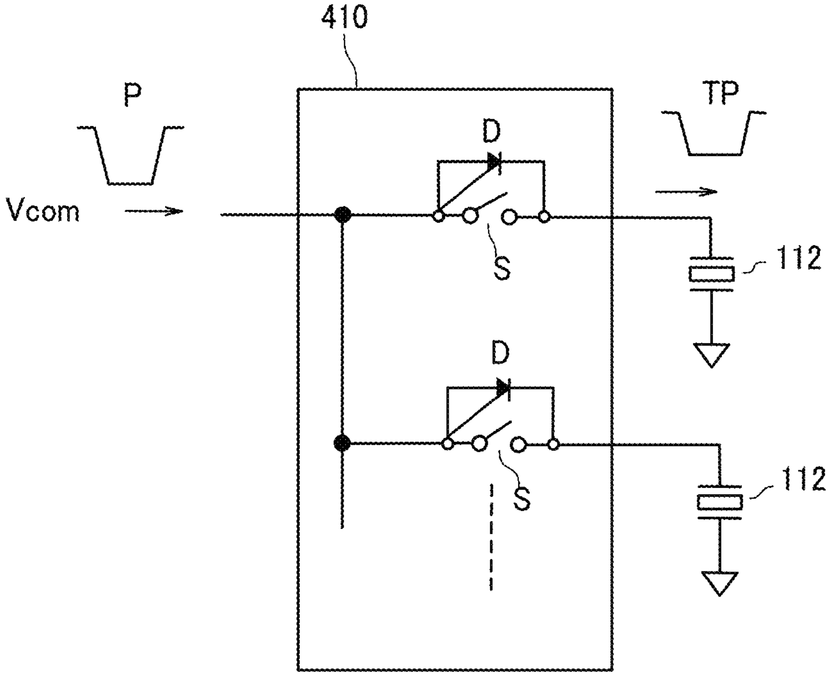
FIG. 6 is an illustration of a switch portion of a head driver for illustrating a portion that selects a common drive waveform of the head driver and an outline of trimming (adjustment of a waveform shape)

Next, with reference to FIG. 6, a description is given of a portion that selects a common drive waveform of the head driver and an outline of trimming (adjustment of a waveform shape). FIG. 6 is an illustration of a switch portion of the head driver.

In the present embodiment, a drive waveform is applied to the piezoelectric element 112 via a switch S that is a switch to input the common drive waveform Vcom. The switch S corresponds to the analog switch AS described above.

By turning on and off the switch S, a desired waveform portion of a drive pulse P of the common drive waveform Vcom can be selected and applied to the piezoelectric element 112 as an application waveform.

The waveform shape of the application waveform of the drive pulse applied to the piezoelectric element 112 can be adjusted by adjusting the timing of turning on and off the switch S. At this time, for at least two drive pulses P, adjusting the timing of turning on and off the switch S with different adjustment values allows the shapes of application waveforms of the at least two drive pulses P to be adjusted with different adjustment values.

Here, the timing of transition of the switch S from an ON state to an OFF state is adjusted to adjust the voltage waveform (falling waveform element a) of the drive pulse P. Diodes D are connected in parallel with the switch S on the input side of the common drive waveform Vcom so that the direction of each piezoelectric element 112 is a forward direction. Charging of the piezoelectric elements 112 (indicated by a rising waveform element b of the drive pulse) is performed through the diodes D.

Since the switch S is provided for each nozzle (for each piezoelectric element 112), the waveform shape of the drive pulse to be applied to the piezoelectric element 112 for each of the plurality of nozzles 104 can be adjusted to reduce the variation in the discharge characteristics.

In such a case, the switch S may be turned on and off, for example, by a method in which a counter is incorporated and the switch S is turned on and off when the clock is counted by the number of adjustment values set in the registers.

There is also a method in which an ON/OFF control signal of the switch S is prepared for each switch S, the ON/OFF control signal transitions to OFF when the ON/OFF control signal is "H", transitions to ON when the ON/OFF control signal is "L", and the switching timing of "H" and "L" of the ON/OFF control signal is adjusted by the value of the adjustment value set in the register, thereby adjusting the ON/OFF timing for each switch S.

Figure 7:
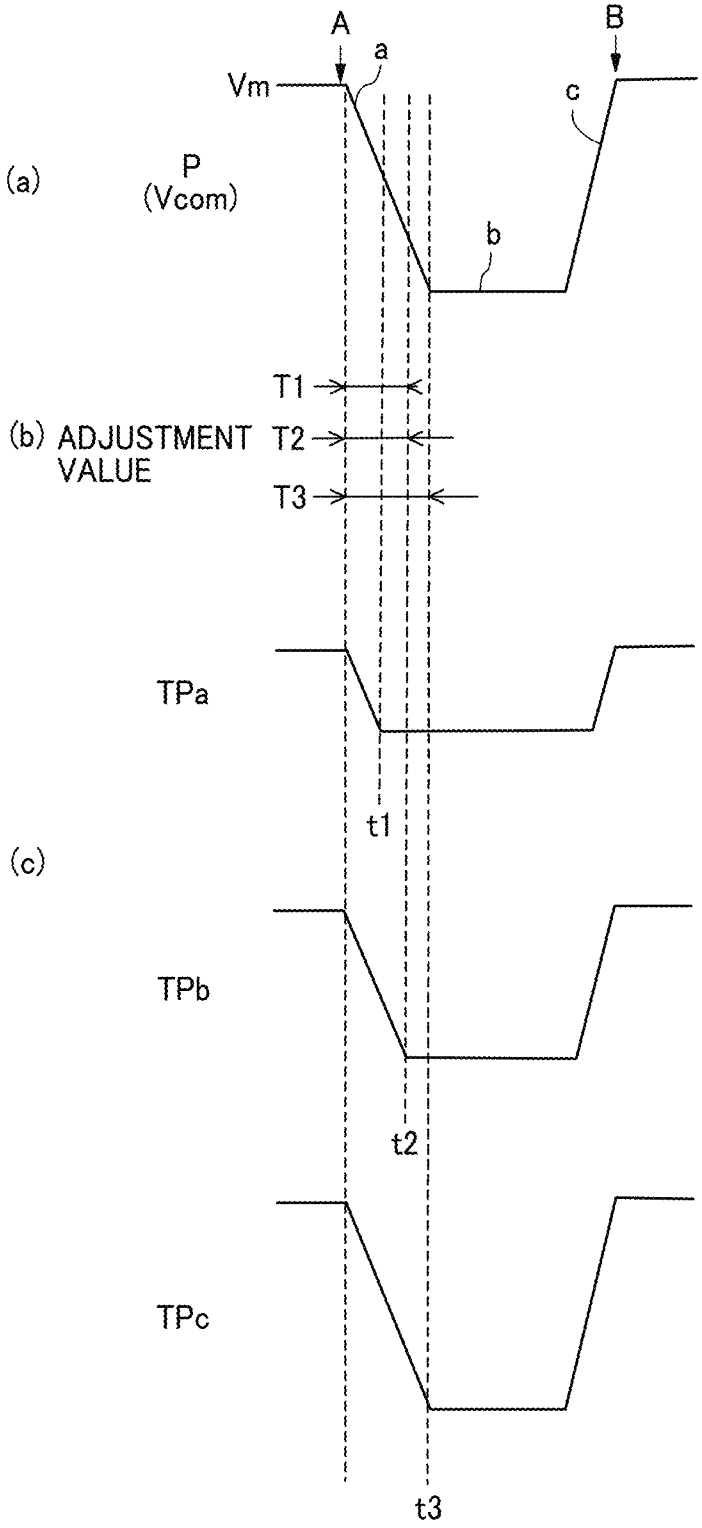
FIG. 7 is a chart illustrating an example of adjustment (trimming) of a waveform shape of an application waveform.

Next, an example of the adjustment (trimming) of the waveform shape of the application waveform is described with reference to FIG. 7. FIG. 7 is a chart of the example of the adjustment. Here, the adjustment values are three adjustment values T1 to T3.

For example, the drive pulse P of the common drive waveform Vcom illustrated in part (a) of FIG. 7 is input to the switch S. The drive pulse P includes a falling waveform element a that falls from an intermediate potential (reference potential) Vm to expand the pressure chamber 106, a holding waveform element b that holds the falling potential of the falling waveform element a, and a rising waveform element c that rises from the held potential to contract the pressure chamber 106.

When the drive pulse P is input, as illustrated in part (b) of FIG. 7, the switch S is turned on (ON state), counting of the adjustment value (ON time of the switch S) set at the timing A is started, and the switch S is turned off (Off state) when the count value becomes the adjustment value.

Here, when the adjustment value (the ON time of the switch S) is an adjustment value T1, the switch S is turned off (OFF state) at a time point t1 at which a time corresponding to the adjustment value T1 has elapsed from the timing A (in other words, the count value has been reached the adjustment value T1). Accordingly, at time t1, the electric-discharge of the piezoelectric element 112 is stopped and the voltage is maintained, so that an application waveform TPa illustrated in part (c) of FIG. 7 is applied to the piezoelectric element 112.

Similarly, in the case of the adjustment value T2, the switch S is turned off (OFF state) at a time point t2 at which a time corresponding to the adjustment value T2 has elapsed from the timing A. Thus, at the time point t2, the electric-discharge of the piezoelectric element 112 is stopped and the voltage is maintained, so that an application waveform TPb illustrated in part (c) of FIG. 7 is applied to the piezoelectric element 112.

Similarly, in the case of the adjustment value T3, the switch S is turned off (OFF state) at a time point t3 at which a time corresponding to the adjustment value T3 has elapsed from the timing A. Thus, at the time point t3, the electric-discharge of the piezoelectric element 112 is stopped and the voltage is maintained, so that an application waveform TPc illustrated in part (c) of FIG. 7 is applied to the piezoelectric element 112.

The application waveform TPa has a low peak value. When the piezoelectric element 112 having a relatively large drive force is driven by the reference drive waveform, applying the application waveform TPa to the piezoelectric element 112 can lower an excessively high drive force.

The application waveform TPb is a medium peak value. When the piezoelectric element 112 having an average drive force is driven by the reference drive waveform, applying the application waveform TPb to the piezoelectric element 112 allows a desired discharging force to be obtained.

The application waveform TPc has a high peak value. When the piezoelectric element 112 having a relatively small drive force is driven by the reference drive waveform, applying the application waveform TPc to the piezoelectric element 112 can raise an excessively low drive force.

For example, if 32 cases are prepared as the timing of turning off the switch S, the waveform shape can be adjusted in 32 stages.

When the voltage of the drive pulse P is equal to or higher than the voltage of the individual electrode of the piezoelectric element 112 (substantially the same voltage as the voltage when the switch S is turned off), more exactly speaking, when the voltage of the drive pulse P is equal to or higher than a sum of the voltage of the individual electrode and the voltage at which the diode D is turned on, the rising waveform element of the drive pulse P is applied to the piezoelectric element 112, so that the piezoelectric element 112 is charged. After the timing B, the switch S may be turned on.

Figure 8:
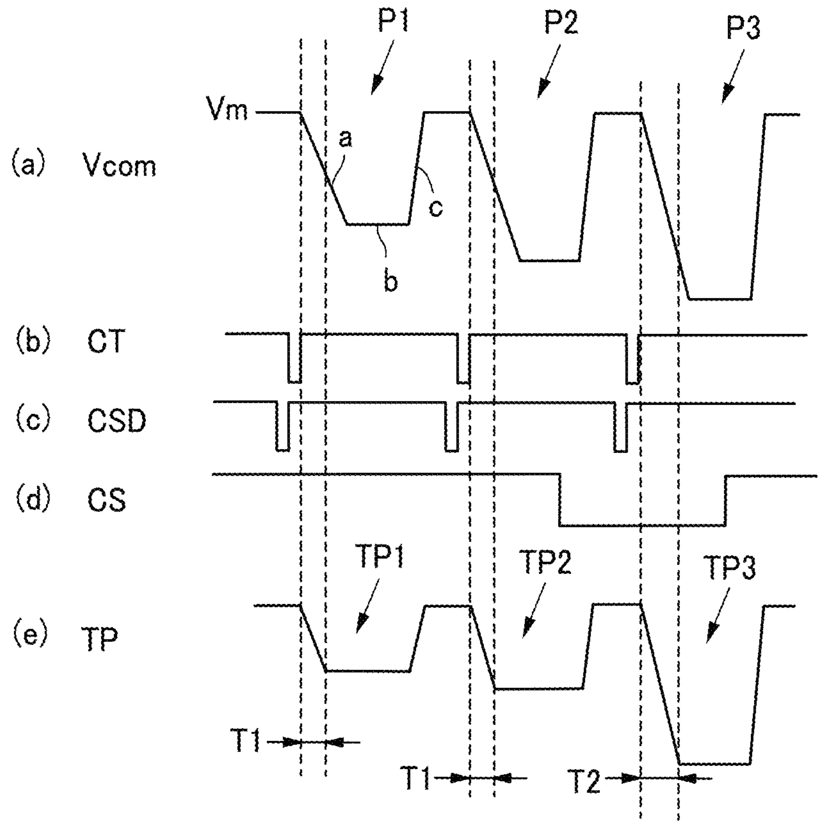
FIG. 8 is a chart illustrating trimming control in a first embodiment of the present disclosure.

Next, the trimming control in the present embodiment is described with reference to FIG. 8. FIG. 8 is a chart of the trimming control in the present embodiment.

In the present embodiment, as illustrated in part (a) of FIG. 8, a common drive waveform Vcom including a plurality of (in this example, three) drive pulses P1, P2, and P3 for discharging liquid in time series is generated and output, and is input to the analog switch AS corresponding to each piezoelectric element 112 of the head driver (driver IC) 410.

Similarly to the drive pulse P, each of the drive pulses P1 to P3 includes a falling waveform element a that falls from an intermediate potential (reference potential) Vm to expand the pressure chamber 106, a holding waveform element b that holds the falling potential of the falling waveform element a, and a rising waveform element c that rises from the held potential to contract the pressure chamber 106.

In this example, the adjustment values are two types of adjustment values T1 and T2. The head controller 401 writes the adjustment value T1 (trimming data TD1) or the adjustment value T2 (trimming data TD2) to the registers 426 and 427 for each nozzle 104.

The head controller 401 transmits the counter trigger signal CT illustrated in part (b) of FIG. 8, the adjustment-value-selection-signal determination signal CSD illustrated in part c) of FIG. 8, and the adjustment-value selection signal CS illustrated in part (d) of FIG. 8 to the selector 413 in synchronization with the common drive waveform Vcom.

In this example, as illustrated in part (b) of FIG. 8, the counter trigger signal CT and the adjustment-value-selection-signal determination signal CDS rise for each of the drive pulses P1 to P3 for adjusting the common drive waveform Vcom.

Then, it is determined whether the adjustment-value selection signal CS is "H" or "L" at the timing of the adjustment-value-selection-signal determination signal CDS, and counting is started at the rising edge of the counter trigger signal CT. At this time, for the drive pulse P for which the adjustment-value selection signal CS is "H", the switch AS is turned off after counting is performed by the value of the adjustment value T1. For the drive pulse P for which the adjustment-value selection signal CS is "L", the switch AS is turned off after counting is performed by the value of the adjustment value T2.

For example, as illustrated in part (d) of FIG. 8, the drive pulses P1 and P2 for which the adjustment-value selection signal CS is "H" are counted with the adjustment value T1, and the drive pulse P3 for which the adjustment-value selection signal CS is "L" is counted with the adjustment value T2.

Thus, as illustrated in part (e) of FIG. 8, the application waveform TP includes an application pulse (discharge pulse) TP1 obtained by adjusting the drive pulse P1 with the adjustment value T1, an application pulse (discharge pulse) TP2 obtained by adjusting the drive pulse P2 with the adjustment value T1, and an application pulse (discharge pulse) TP3 obtained by adjusting the drive pulse P3 with the adjustment value T2.

As described above, for each drive pulse of the common drive waveform Vcom, two types of adjustment can be individually performed for each nozzle. In other words, at least two or more drive pulses applied to the pressure generating element are adjusted to have two or more types of waveform shapes for each nozzle.

Accordingly, the discharge characteristics (discharge speed, discharge amount, and the like) of a small droplet constituted by a single drive pulse and a medium droplet or a large droplet constituted by a plurality of drive pulses can be made uniform, or both the discharge speed and the discharge amount can be made uniform.

Here, a description is given of an example in which discharge characteristics of droplets of different sizes, for example, a small droplet, a medium droplet, and a large droplet are made uniform.

Using the common drive waveform Vcom illustrated in FIG. 8, the drive pulse P1 is selected to discharge a small droplet, the drive pulses P1 and P3 are selected to discharge a medium droplet, and the drive pulses P1, P2, and P3 are selected to discharge a large droplet.

In such a case, first, regarding the small droplet, the drive pulse P1 is adjusted to perform trimming so that the characteristics of the plurality of nozzles 104 are uniform, and the adjustment value at that time is set to the drive pulse P1. Next, regarding the medium droplet, the drive pulse P3 is adjusted while applying the adjustment amount in the trimming of the small droplet to the drive pulse P1. Thus, trimming is performed so that the discharge characteristics of the plurality of nozzles 104 are uniform, and the adjustment value at that time is set to the drive pulse P3. Finally, regarding the large droplet, the drive pulse P2 is adjusted while applying the adjustment amounts in the trimming of the small droplet and the medium droplet to the drive pulse P1 and the drive pulse P3. Thus, trimming is performed so that the discharge characteristics of the plurality of nozzles 104 are uniform.

As a result, droplets of different sizes are defined as a first droplet (small droplet) and a second droplet (medium droplet, large droplet). When the drive pulse used for discharging the second droplet includes the drive pulse used for discharging the first droplet, the shapes of application waveforms are the same when the drive pulse used in common for discharging the first droplet and the second droplet is applied to the pressure generating element.

Next, a description is given of an example in which both the discharge speed (droplet speed) and the discharge amount (droplet weight) are made uniform.

A first pulse dominant in the discharge amount and a second pulse dominant in the discharge speed when adjusted are prepared as a common drive waveform. After the discharge amount of each nozzle 104 is made uniform with the first pulse, the discharge speed of each nozzle 104 is made uniform with the second pulse.

Figure 9:
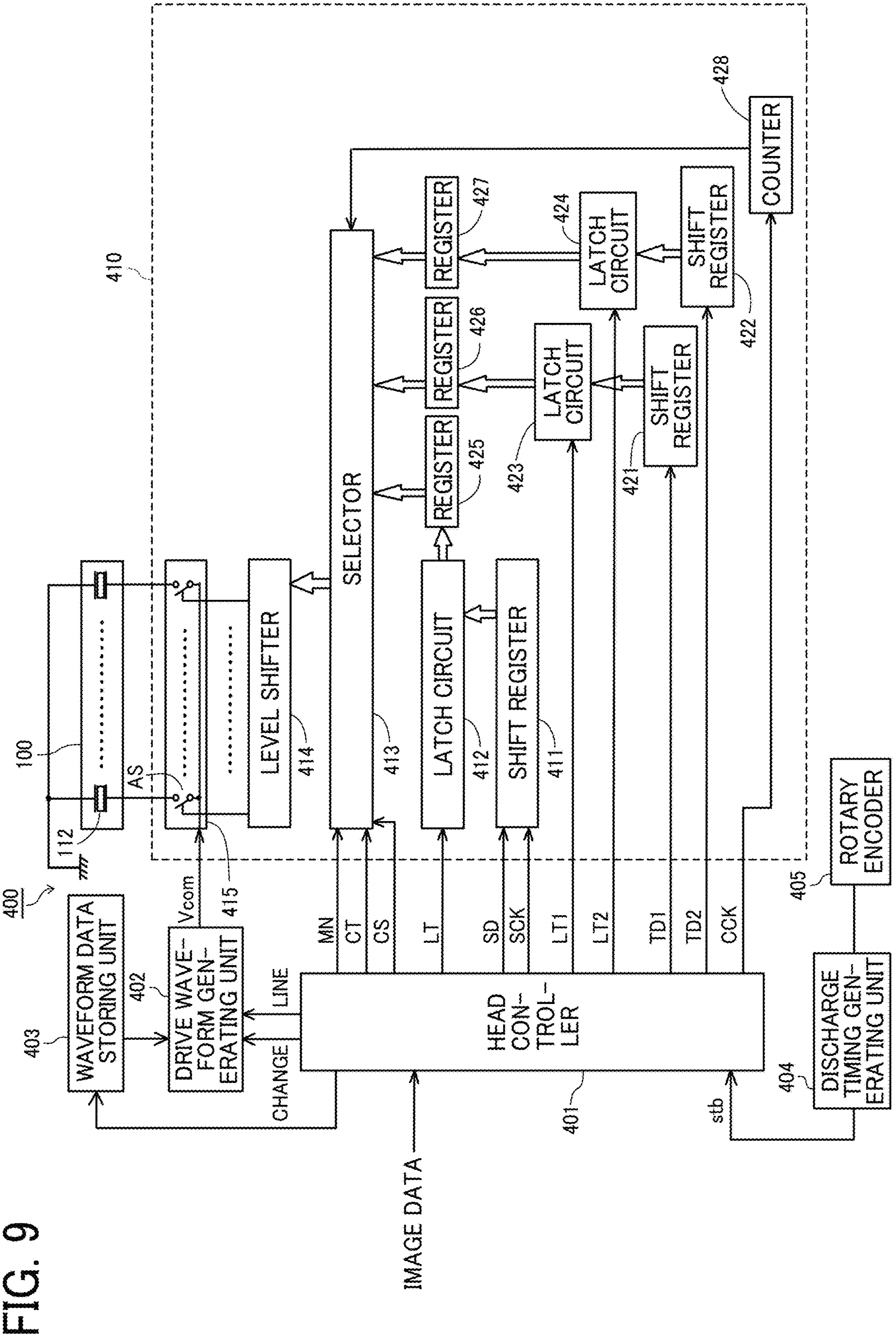
FIG. 9 is a block diagram of a head drive control device according to a second embodiment of the present disclosure.

Next, a head drive control device according to a second embodiment of the present disclosure is described with reference to FIG. 9. FIG. 9 is a block diagram of the head drive control device according to the second embodiment.

The present embodiment differs from the first embodiment only in that the adjustment-value-selection-signal determination signal CSD is not input from the head controller 401 to the selector 413.

In the present embodiment, the selector 413 as a switch selector inputs a signal (adjustment-value selection signal) CS for selecting an adjustment value and turns off the analog switch AS as a switch unit based on the count result of the counter 428 as a count unit and the different adjustment values T1 and T2 held in the registers 426 and 427.

The selector 413 reads the state of the adjustment-value selection signal CS when the count start trigger signal, which is a trigger for starting counting by the counter 428, transitions from a first state (ON state) to a second state (OFF state), and determines which of the adjustment value T1 and the adjustment value T2 is selected.

Then, the analog switch AS is turned off when the count value from the time when the count start trigger signal transits from the second state (OFF state) to the first state (ON state) reaches the selected adjustment value.

Figure 10:
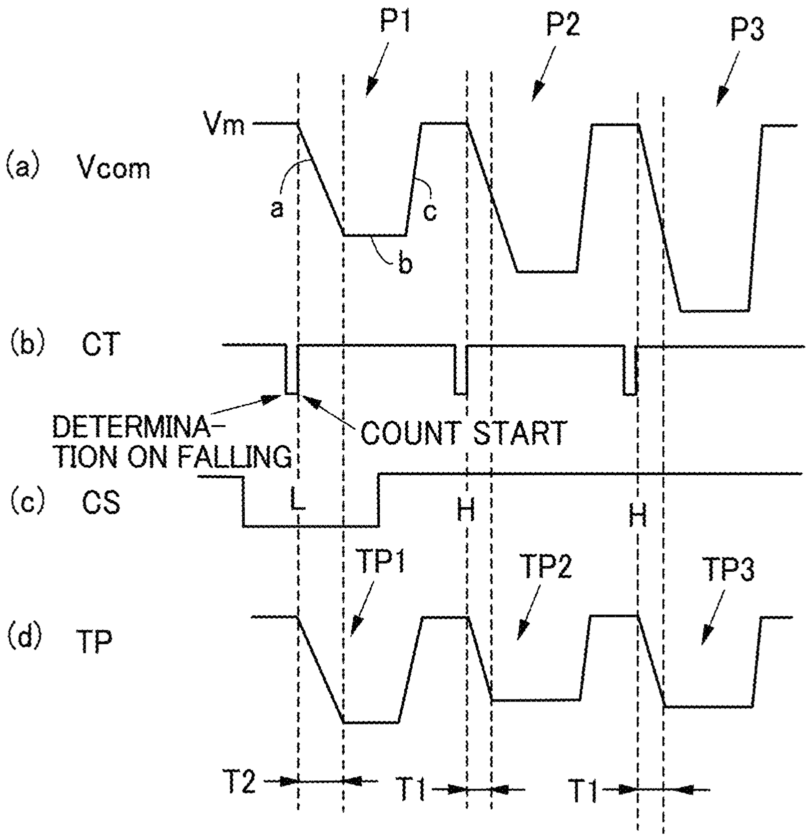
FIG. 10 is a chart illustrating trimming control in the second embodiment.

Next, trimming control in the second embodiment is described with reference to FIG. 10. FIG. 10 is a chart of the trimming control in the second embodiment.

In the present embodiment, as illustrated in part (a) of FIG. 10, a common drive waveform Vcom including a plurality of (in this example, three) drive pulses P1, P2, and P3 for discharging liquid in time series is generated and output, and is input to the analog switch AS corresponding to each piezoelectric element 112 of the head driver (driver IC) 410.

Similarly to the drive pulse P, each of the drive pulses P1 to P3 includes a falling waveform element a that falls from an intermediate potential (reference potential) Vm to expand the pressure chamber 106, a holding waveform element b that holds the falling potential of the falling waveform element a, and a rising waveform element c that rises from the held potential to contract the pressure chamber 106.

In this example, the adjustment values are two types of adjustment values T1 and T2. The head controller 401 writes the adjustment value T1 (trimming data TD1) or the adjustment value T2 (trimming data TD2) to the registers 426 and 427 for each nozzle 104.

The head controller 401 transmits the counter trigger signal CT illustrated in part (b) of FIG. 10 and the adjustment-value selection signal CS illustrated in part (c) of FIG. 10 to the selector 413 in synchronization with the common drive waveform Vcom.

In this example, as illustrated in part (b) of FIG. 10, the counter trigger signal CT rises for each of the drive pulses P1 to P3 for adjusting the common drive waveform Vcom.

Then, it is determined whether the adjustment-value selection signal CS is "H" or "L" at the timing of the falling (or rising) of the counter trigger signal CT, and counting is started at the rising of the counter trigger signal CT. At this time, for the drive pulse P for which the adjustment-value selection signal CS is "H", the switch AS is turned off after counting is performed by the value of the adjustment value T1. For the drive pulse P for which the adjustment-value selection signal CS is "L", the switch AS is turned off after counting is performed by the value of the adjustment value T2.

For example, as illustrated in part (c) of FIG. 10, the drive pulse P1 for which the adjustment-value selection signal CS is "L" is counted with the adjustment value T2, and the drive pulses P2 and P3 for which the adjustment-value selection signal CS is "H" are counted with the adjustment value T1.

Thus, as illustrated in part (e) of FIG. 10, the application waveform TP includes an application pulse (discharge pulse) TP1 obtained by adjusting the drive pulse P1 with the adjustment value T2, an application pulse (discharge pulse) TP2 obtained by adjusting the drive pulse P1 with the adjustment value T1, and an application pulse (discharge pulse) TP3 obtained by adjusting the drive pulse P3 with the adjustment value T1.

As described above, for each drive pulse of the common drive waveform Vcom, two types of adjustment can be individually performed for each nozzle. Accordingly, the discharge characteristics (discharge speed, discharge amount, and the like) of a small droplet constituted by a single drive pulse and a medium droplet or a large droplet constituted by a plurality of drive pulses can be made uniform, or both the discharge speed and the discharge amount can be made uniform.

Figure 11:
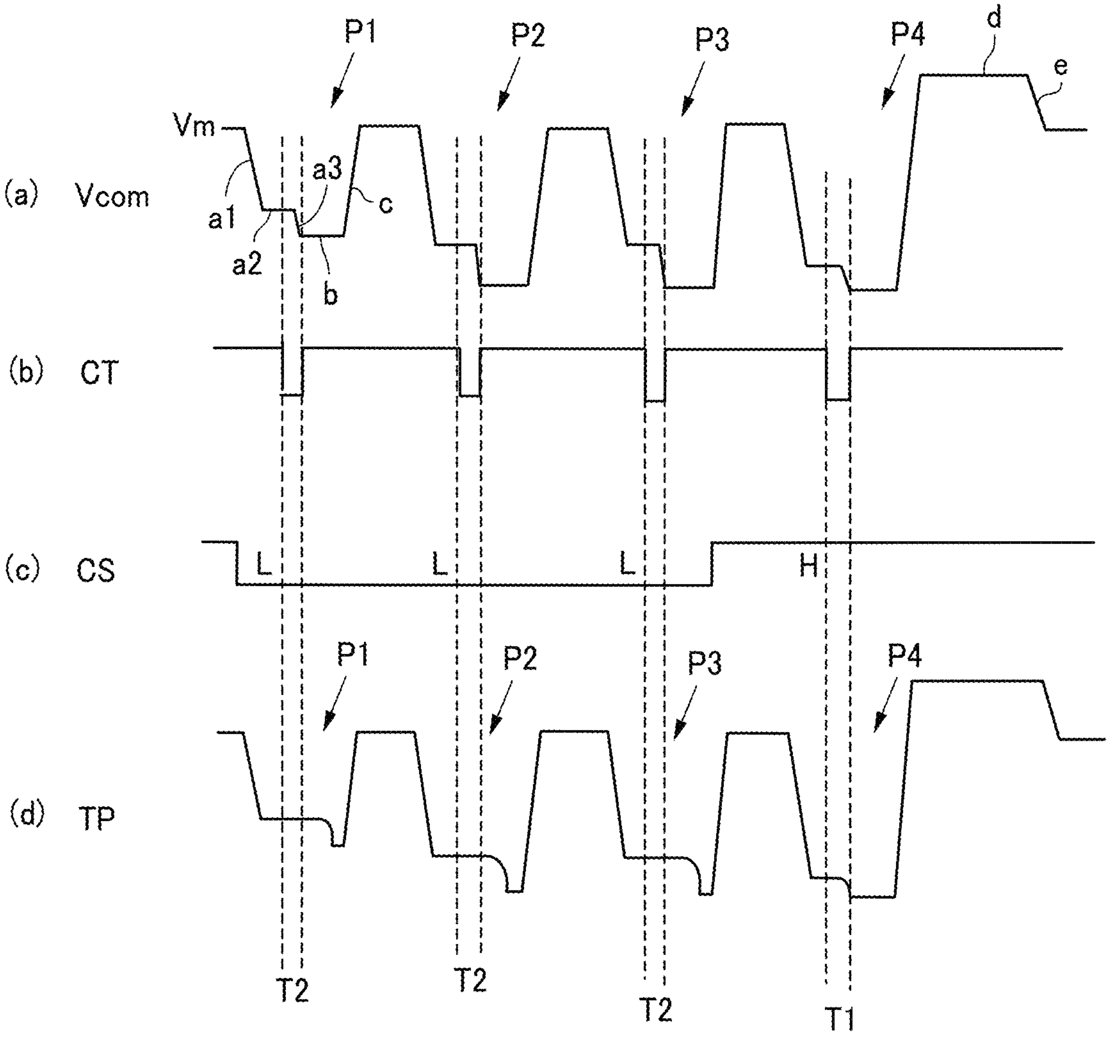
FIG. 11 is a chart illustrating trimming control in a third embodiment of the present disclosure.

Next, a third embodiment of the present disclosure is described with reference to FIG. 11. FIG. 11 is a chart of the trimming control in the third embodiment.

In the present embodiment, as illustrated in part (a) of FIG. 11, a common drive waveform Vcom including a plurality of (in this example, four) drive pulses P1, P2, P3, and P4 for discharging liquid in time series is generated and output, and is input to the analog switch AS corresponding to each piezoelectric element 112 of the head driver (driver IC) 410.

In each of the drive pulses P1 to P4, a falling waveform element a that falls from the intermediate potential (reference potential) Vm to expand the pressure chamber 106 includes a first falling waveform element a1, a first falling holding waveform element a2, and a second falling waveform element a3.

The first falling waveform element a1 falls from the intermediate potential (reference potential) Vm to a predetermined potential to expand the pressure chamber 106. The first falling holding waveform element a2 holds the falling potential of the first falling waveform element a1. The second falling waveform element a3 further falls from the potential held by the first falling waveform element a2 to expand the pressure chamber 106.

Each of the drive pulses P1 to P4 further includes a holding waveform element b that holds the falling potential of the second falling waveform element a3 and a rising waveform element c that rises from the held potential to contract the pressure chamber 106.

Further, after the drive pulse P4, a holding waveform element d for holding the rising potential of the rising waveform element c rising beyond the intermediate potential Vm of the drive pulse P4 and a falling waveform element e falling from the potential held by the holding waveform element d to the intermediate potential Vm are arranged.

In this example, the adjustment values are two types of adjustment values T1 and T2. The head controller 401 writes the adjustment value T1 (trimming data TD1) or the adjustment value T2 (trimming data TD1) to the registers 426 and 427 for each nozzle 104.

The head controller 401 transmits the counter trigger signal CT illustrated in part (b) of FIG. 11 and the adjustment-value selection signal CS illustrated in part (c) of FIG. 11 to the selector 413 in synchronization with the common drive waveform Vcom.

In this example, as illustrated in part (b) of FIG. 11, the counter trigger signal CT rises for each of the drive pulses P1 to P4 for adjusting the common drive waveform Vcom.

Then, it is determined whether the adjustment-value selection signal CS is "H" or "L" at the timing of the falling (or rising) of the counter trigger signal CT, and counting is started at the rising of the counter trigger signal CT. At this time, for the drive pulse P for which the adjustment-value selection signal CS is "H", the switch AS is turned off after counting is performed by the value of the adjustment value T1. For the drive pulse P for which the adjustment-value selection signal CS is "L", the switch AS is turned off after counting is performed by the value of the adjustment value T2.

For example, as illustrated in part (c) of FIG. 11, the drive pulses P1 to P3 for which the adjustment-value selection signal CS is "L" are counted with the adjustment value T2, and the drive pulse P4 for which the adjustment-value selection signal CS is "H" are counted with the adjustment value T1.

Thus, as illustrated in part (e) of FIG. 11, the application waveform TP includes application pulses (discharge pulses) TP1 to TP3 obtained by adjusting the drive pulse P1 with the adjustment value T2 and an application pulse (discharge pulse) TP4 obtained by adjusting the drive pulse P4 with the adjustment value T1.

As described above, for each drive pulse of the common drive waveform Vcom, two types of adjustment can be individually performed for each nozzle. Accordingly, the discharge characteristics (discharge speed, discharge amount, and the like) of a small droplet constituted by a single drive pulse and a medium droplet or a large droplet constituted by a plurality of drive pulses can be made uniform, or both the discharge speed and the discharge amount can be made uniform.

Further, in the trimming in the case of using a multi-stage (here, two-stage) falling waveform or a multi-stage rising waveform as in the present embodiment, it is necessary to turn off the switch once before the trimming. Therefore, in general, a timing signal for turning off the switch is required. According to the configuration of the present embodiment, the timing signal can also be used as a trimming-value read signal (counter trigger signal), thus restraining an increase in the number of signal lines.

In the embodiments of the present disclosure, the liquid to be discharged is not limited to a particular liquid provided that the liquid has a viscosity or surface tension dischargeable from a head. However, preferably, the viscosity of the liquid is not greater than 30 mPa's under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

Examples of the liquid discharge apparatus include, not only apparatuses capable of discharging liquid to materials to which liquid can adhere, but also apparatuses to discharge a liquid toward gas or into a liquid.

The liquid discharge apparatus can include at least one of devices for feeding, conveying, and ejecting a material to which liquid can adhere. The liquid discharge apparatus can further include at least one of a pretreatment apparatus and a post-treatment apparatus.

The liquid discharge apparatus may be, for example, an image forming apparatus to form an image on a sheet by discharging ink, or a three-dimensional apparatus to discharge a molding liquid to a powder layer in which powder material is formed in layers, so as to form a three-dimensional article.

The liquid discharge apparatus is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "material onto which liquid adheres" denotes, for example, a material or a medium onto which liquid is adhered at least temporarily, a material or a medium onto which liquid is adhered and fixed, or a material or a medium onto which liquid is adhered and into which the liquid permeates. Examples of the "material onto which liquid adheres" include recording media or medium such as a paper sheet, a recording paper, and a recording sheet of paper, film, and cloth, electronic components such as an electronic substrate and a piezoelectric element, and media or medium such as a powder layer, an organ model, and a testing cell. The "material onto which liquid adheres" includes any material on which liquid adheres unless particularly limited.

The above-mentioned "material onto which liquid adheres" may be any material as long as liquid can temporarily adhere such as paper, thread, fiber, cloth, leather, metal, plastic, glass, wood, ceramics, or the like.

The liquid discharge apparatus may be an apparatus to relatively move a liquid discharge head and a material on which liquid can be adhered. However, the liquid discharge apparatus is not limited to such an apparatus. For example, the liquid discharge apparatus may be a serial head apparatus that moves the liquid discharge head or a line head apparatus that does not move the liquid discharge head.

Examples of the "liquid discharge apparatus" further include a treatment liquid coating apparatus to discharge a treatment liquid to a sheet to coat the treatment liquid on a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" are herein used as synonyms.

Embodiments of the present disclosure are not limited to the elements described in the above-described embodiments. The elements of the above-described embodiments can be modified without departing from the gist of the present disclosure, and can be appropriately determined according to the application form. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:
- a liquid discharger including a plurality of nozzles to discharge liquid;
- an individually controllable switch for each of the plurality of nozzles; and
- circuitry configured to:
- generate and output a common drive waveform including a plurality of drive pulses, including a first drive pulse and a second drive pulse, for discharging the liquid,
- select the first drive pulse from the common drive waveform and apply the first drive pulse to a pressure generating element of the liquid discharger for discharging a first droplet from the liquid discharger,
- select drive pulses including the first drive pulse and the second drive pulse from the common drive waveform and apply the drive pulses including the first pulse and the second pulse for discharging a second droplet of which size is different from the first droplet,
- individually adjust the first drive pulse with a first adjustment value for each of the plurality of nozzles,
- individually adjust the second drive pulse with a second adjustment value which is different value from the first adjustment value for each nozzle, and
- hold the first adjustment value and the second adjustment value for each of the plurality of nozzles in registers.

2. The liquid discharge apparatus according to claim 1, wherein the circuitry is further configured to adjust application waveform shapes of the first drive pulse and the second drive pulse applied to the pressure generating element via controlling a timing of a transition of the switch from a first state to a second state in the same drive pulse to control a shape of the waveform.

3. The liquid discharge apparatus according to claim 1, wherein the circuitry is configured to
- change a timing of turning on and off the individually controllable switch to input the plurality of drive pulses, in accordance with the first adjustment value and the second adjustment value held in the circuitry.

4. The liquid discharge apparatus according to claim 2, wherein the circuitry is configured to:
- receive a selection signal for selecting one of the first adjustment value and the second adjustment value and turn off the switch based on a count result of a counter and the different adjustment values held in the circuitry;
- read a state of the selection signal when a count start trigger signal as a trigger for starting counting by the counter transitions from a first state to a second state; and
- turn off the individually controllable switch when a count value counted from when the count start trigger signal transitions from the second state to the first state becomes the one of the first adjustment value and the second adjustment value selected based on the selection signal.

5. The liquid discharge apparatus according to claim 1, wherein the plurality of drive pulses of the common drive waveform includes a first falling waveform element, a first falling holding waveform element that holds a potential having fallen by the first falling waveform element, and a second falling waveform element that falls from the potential held by the first falling holding waveform element, and wherein the circuitry is configured to turn off a switch in the first falling holding waveform element.

6. The liquid discharge apparatus according to claim 1, wherein the first droplet is a small droplet, and the second droplet is a large droplet or a medium droplet.

7. The liquid discharge apparatus according to claim 1, wherein the circuitry is configured to adjust a discharge amount of one of the first droplet and the second droplet and a discharge speed of the other of the first droplet and the second droplet.

8. A head drive control method, comprising:
- generating and outputting a common drive waveform including a plurality of drive pulses, including a first drive pulse and a second drive pulse, for discharging liquid from a plurality of nozzles of a liquid discharger;
- selecting the first drive pulse from the common drive waveform and applying the first drive pulse to a pressure generating element of the liquid discharger for discharging a first droplet from the liquid discharger;
- selecting drive pulses including the first drive pulse and the second drive pulse from the common drive waveform and applying the drive pulses including the first drive pulse and the second drive pulse for discharging a second droplet of which size is different from the first droplet;
- individually adjusting the first drive pulse with a first adjustment value for each of the plurality of nozzles;
- individually adjusting the second drive pulse with a second adjustment value which is different value from the first adjustment value for each of the plurality of nozzles; and
- hold the first adjustment value and the second adjustment value for each of the plurality of nozzles in registers.

9. A head drive control device comprising:
- circuitry is configured to:
- generate and output a common drive waveform including a plurality of drive pulses, including a first drive pulse and a second drive pulse, for discharging liquid from a liquid discharger having a plurality of nozzles;
- select the first drive pulse from the common drive waveform and apply the first drive pulse to a pressure generating element of the liquid discharger for discharging a first droplet from the liquid discharger,
- select drive pulses including the first drive pulse and the second drive pulse from the common drive waveform and apply the drive pulses including the first drive pulse and the second drive pulse for discharging a second droplet of which size is different from the first droplet,
- individually adjust the first drive pulse with a first adjustment value for each of the plurality of nozzles,
- individually adjust the second drive pulse with a second adjustment value which is different value from the first adjustment value for each of the plurality of nozzles, and
- hold the first adjustment value and the second adjustment value for each of the plurality of nozzles in registers.

* * * * *